United States Patent [19]

Klein

[11] 4,456,784
[45] Jun. 26, 1984

[54] CONDUIT SEALING CONNECTOR

[75] Inventor: Gary S. Klein, Cleveland, Ohio

[73] Assignee: Eaton Corporation, Cleveland, Ohio

[21] Appl. No.: 362,566

[22] Filed: Mar. 26, 1982

[51] Int. Cl.³ .................. H02G 3/04; H02G 15/013
[52] U.S. Cl. .................... 174/23 R; 174/77 R; 174/DIG. 8
[58] Field of Search ........... 174/23 R, 23 C, DIG. 8, 174/92, 76, 77 R; 169/48; 285/381

[56] References Cited

U.S. PATENT DOCUMENTS

| | | | |
|---|---|---|---|
| 1,283,574 | 11/1918 | Schuster et al. | 174/76 |
| 2,198,368 | 4/1940 | Lavarack | 174/75 B |
| 2,227,954 | 1/1941 | Bissell | 174/23 R |
| 3,728,466 | 4/1973 | Rocton et al. | 174/23 R |
| 3,744,823 | 7/1973 | Muir et al. | 285/381 X |
| 3,837,686 | 9/1974 | Powell | 285/382 X |
| 3,864,883 | 2/1975 | McMarlin | 169/48 X |
| 3,990,661 | 11/1976 | De Groef | 174/DIG. 8 X |
| 4,093,818 | 6/1978 | Thwaites et al. | 174/48 |
| 4,099,020 | 7/1978 | Kohaut | 174/48 |
| 4,283,079 | 8/1981 | Flaherty | 285/381 |
| 4,287,034 | 9/1981 | Pieslak et al. | 174/DIG. 8 X |
| 4,310,184 | 1/1982 | Campbell | 285/382 X |
| 4,319,074 | 3/1982 | Yaste et al. | 174/23 X |
| 4,328,982 | 5/1982 | Christianson | 285/369 X |

FOREIGN PATENT DOCUMENTS 2052683 5/1972 Fed. Rep. of Germany ........ 169/48
1431167 4/1976 United Kingdom ......... 174/DIG. 8

OTHER PUBLICATIONS

Masterson, J. B.; "Pressure Dams in Communication Cables"; Wire and Wire Products; May 1970; pp. 61-65.
Crouse-Hinds Company -"Condulet, Seals, Breathers, Drains," dated Aug. 1974.
Crouse-Hinds Company -"Condulet Sealing Fittings," Dated Jun. 1980.

Primary Examiner—J. V. Truhe
Assistant Examiner—Morris H. Nimmo
Attorney, Agent, or Firm—C. H. Grace; A. E. Chrow

[57] ABSTRACT

Disclosed is a conduit sealing connector that may be made from metal or a heat stable polymeric material that is adapted to secure at least two conduits together that also may be made from a metallic or heat stable polymeric material. The connector is provided with a sleeve having a chamber therewithin containing an expandable material which upon heating the connector after is is secured to the conduits is able to expand and engulf any electrical conductors and/or cables extending through the connector between the conduits and fill the chamber sufficiently to provide a barrier against the flow of vapor through the conduits.

18 Claims, 5 Drawing Figures

CONDUIT SEALING CONNECTOR

INTRODUCTION

This invention is related in part but distinguishable from my copending U.S. patent application Ser. No. 350,980 filed on Feb. 22, 1982.

This invention relates generally to a connector for connecting the ends of conduit together for protecting one or more electrical conductors passing from one conduit to the other and more particularly to such connector in the form of a sleeve which is provided with an expandable material disposed within a chamber of the sleeve that is adapted to expand and engulf the conductor without damage thereto and fill the chamber sufficiently to provide a barrier against the flow of vapor through the conduits in response to the exposure of the sleeve to an amount of heat sufficient to expand the material.

BACKGROUND OF THE INVENTION

It is common practice to pass electrical conductors and cable through conduit (typically metal conduit) from one point to another as a means of providing support and protection for the conductors and the cables. The term "conduit" refers to pipe having dimensional and other characteristics suitable for use by the electrical industry as is well known by those ordinarily skilled in the art. Although hereinafter referred to as conduit, it is to be understood that the term "conduit" as used herein means conduit made from metallic or heat stable polymeric materials and includes pipe made from metal or heat stable polymeric materials that, although not conduit, is able to serve the purpose of conduit where such is desired.

Conduit may often inadvertently or unavoidably provide a passageway from a region in which explosive, corrosive, toxic or otherwise undesirable vapors are present to a region free of such vapors. In an effort to prevent the passage of such vapors through the conduit, it has been common practice in the past to pack the openings between the conduit and the conductors and cable with some type of heavy pliable material to provide a barrier to the flow of such vapors through the conduit. In recognizing the problem, minimum performance criteria has been established under relevant sections of the National Electrical Code for controlling the manner in which conduit located in hazardous locations is sealed.

The manner in which conduit has been sealed in the past however has typically involved expensive fittings of complex design that are commonly adapted to be used in conjuction with sealant materials which may require mixing of several components to impart sufficient viscosity to withstand the pressure of the vapors and require costly inventory of components.

One method commonly used at the present time for sealing electrical conductors at a junction between conduits is to use metal connectors sold by Crouse-Hinds Company under series numbers EYS, EZS, EYD, EZD and ECD. The connectors feature a port-filling entrance into which a sealant, recommended and sold by Crouse-Hinds Company under the trademark "Chico", can be poured into their connector to provide a barrier against the flow of vapor through the conduits in conjunction with the use of a fiber sold by Crouse-Hinds under the trademark "Chico X Fiber" for providing a dam within the connector to prevent the flow of the sealing compound into the ends of the conduits.

The complexities, costs and requirement to inventory multiple components of prior-art systems and the need to provide a simpler and lower cost method of connecting metal conduit together and provide a barrier against the flow of vapor through the conduits represents a problem which, although long known to industry, has not, up until the time of the present invention, had a completely satisfactory solution.

SUMMARY OF THE INVENTION

Accordingly, it is an object of this invention to provide a connector for connecting at least two conduits together that is also able to provide a barrier against the flow of vapor through the conduits in a simple and inexpensive manner.

It is another object of this invention to provide a connector for connecting at least two conduits containing electrical conductors together that is simple to use as well as provide a barrier against the flow of vapor through the conduits in a simple manner without the necessity of having to inventory multiple components.

It is a feature of this invention to provide a connector for connecting at least two conduits together which by the simple application of a suitable amount of heat is able to expand an expandable material contained within the connector to individually protect electrical conductors and/or cables extending through the connector between the conduits in addition to providing a barrier against the flow of vapor through the conduits.

DESCRIPTION OF THE PREFERRED EMBODIMENTS

Figure 1:
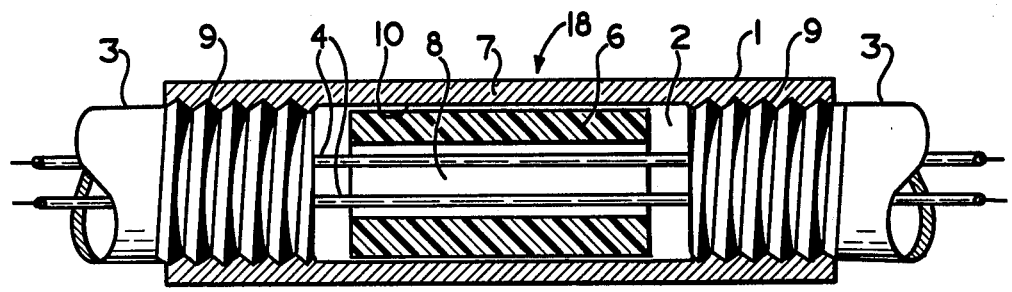
FIG. 1 shows an axial longitudinal section through an embodiment of the connector of the invention prior to its exposure to heat.

FIG. 1 shows an embodiment of the invention in the form of connector 18 prior to its exposure to heat. Connector 18 has an open-ended sleeve 1 having a substantially annular shaped wall 7 enclosing chamber 2. At least a portion of the inner surface 10 of wall 7 faces towards electrical condutors 4 within chamber 2. Sleeve 1 has openings, not referenced, at its opposite ends which communicate with chamber 2 and are each dimensionally adapted to receive a conduit 3 therein and threadingly secure connector 18 to conduits 3 by means of threads 9 representing mating threads on both inner surface 10 of wall 7 and on the outer surface of the end of conduits 3. The length of mating threads 9 is sufficient to insure suitable securement between connector 18 and conduits 3. A pair of electrical conductors 4 extend through chamber 2 of sleeve 1 from one conduit 3 to the other.

Expandable material 6 is disposed in the form of an annular layer loosely on inner surface 10 of wall 7 within chamber 2 by any suitable manner. The material 6 layer has a cavity 8 therethrough that, prior to exposure of sleeve 1 to an amount of heat sufficient to cause material 6 to expand, is dimensionally adapted to permit conductors 4 to extend between conduits 3 through connector 18. The length and thickness of the layer of material 6 is such that it is able to be disposed within chamber 2 and which, upon its radial inward expansion by heat, will engulf conductors 4 and fill chamber 2 sufficiently to provide a barrier against the flow of vapor between conduits 3 through connector 18.

Material 6 is made from a material having the properties to resist degradation and provide a barrier against the particular vapor or vapors involved in the application. Material 6 preferably is also an electrically insulative material such that upon its expansion it is able to electrically insulate conductors 4 from each other. Material 6 may for example be a material that expands into a foam that engulfs conductor 4 and fills chamber 2. Material 6 may also for example contain a sufficient amount of heat-activatable cross-linking agent to crosslink material 6 when it is expanded by heat. Material 6 may be a halogenated or a non-halogenated polymeric material that is adapted to expand and engulf conductors 4 and fill chamber 2 when sleeve 1 is subjected to a sufficient amount of heat. Material 6 may also be a heat reactive intumescent material such as a silicone, epoxy, polyester, polyolefin, polyurethane, acrylic or siliceous material or certain ceramic materials or blends of such materials which may further include chemical blowing agents, catalysts, exothermic reagents, intumescing agents, gas generators, sensitizers for crosslinking and the like. An example of a particular material found to be of advantage as material 6 for use in the connector of the invention is an ethylene vinyl acetate-polyolefin copolymer compound containing an amount of dicumyl peroxide sufficient to cause the compound to expand when subjected to heat and engulf conductors 4 and fill chamber 2 sufficiently to provide a barrier to the flow of vapors through the connector from one conduit to the other in addition to becoming crosslinked during the expansion process.

Figure 2:
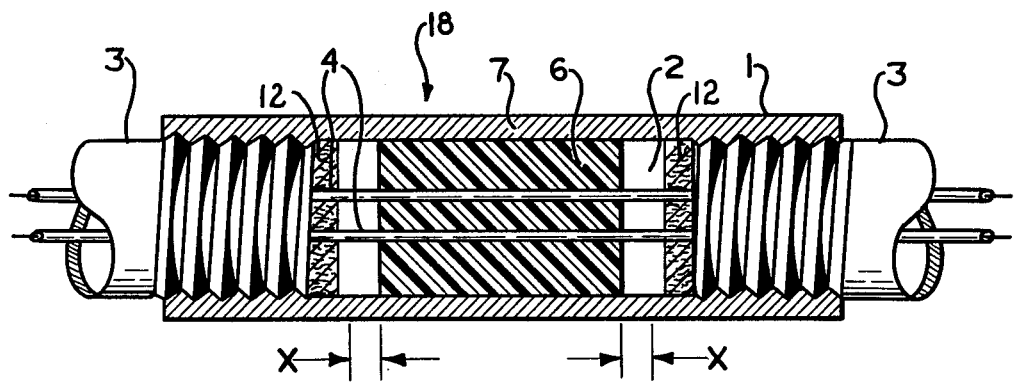
FIG. 2 shows an axial longitudinal section of the embodiment of the connector of FIG. 1 subsequent to its exposure to heat.

FIG. 2 shows connector 18 of FIG. 1 after the exposure of sleeve 1 to an amount of heat sufficient to expand material 6. In FIG. 2, the layer of material 6 has shortened a distance of "2X" as a result of its having expanded radially inwardly to engulf conductors 4. It will be noted that material 6 fills chamber 2 sufficiently to provide a barrier against the flow of vapor through connector 18. Material 6 is expanded by exposing the outer surface, not referenced, of wall 7 of sleeve 1 by suitable means to an amount of heat sufficient to effect the expansion required of material 6. Although material 6 of connector 18 of FIGS. 1 and 2 is of a type which shortens along its length as a result of its expansion radially inwardly, it may also be of a type that expands both radially inwardly and axially when subjected to the amount of heat sufficient to effect such expansion.

Although sleeve 1 and conduits 3 are typically made from a metallic material, either or both may be made from a polymeric material that possesses sufficient heat stability to resist degradation and substantial dimensional change when subjected to the amount of heat required to expand material 6. The type of material 6 used in conjunction with the connector of the invention necessarily must take into account whether the conduits and/or sleeve of the connector is made from a metallic or polymeric material in order to ensure that the sleeve or conduit are not damaged upon exposure to the amount of heat necessary to expand material 6.

Figure 4:
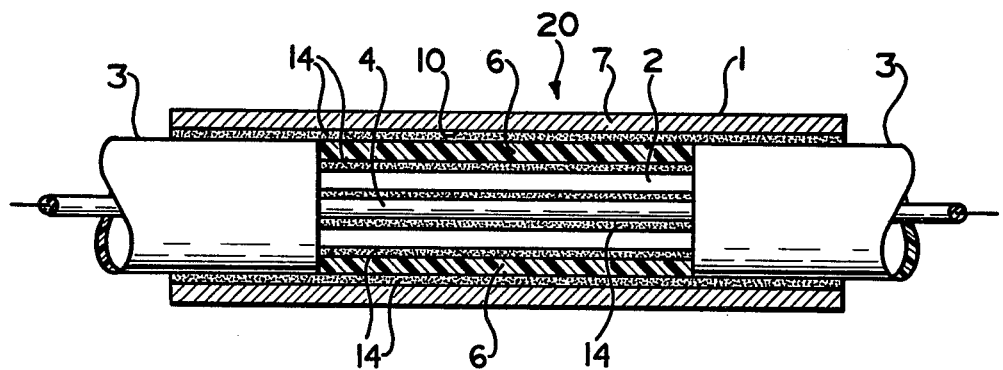

Although conduits 3 are shown in FIGS. 1 and 2 as being threadingly secured to the connector of the invention, it is to be understood that any means of connecting conduits 3 to the connector is within the scope of the invention such as, for example, in FIG. 4 where sleeve 1 and conduits 3 are adhesively secured together.

Figure 3:
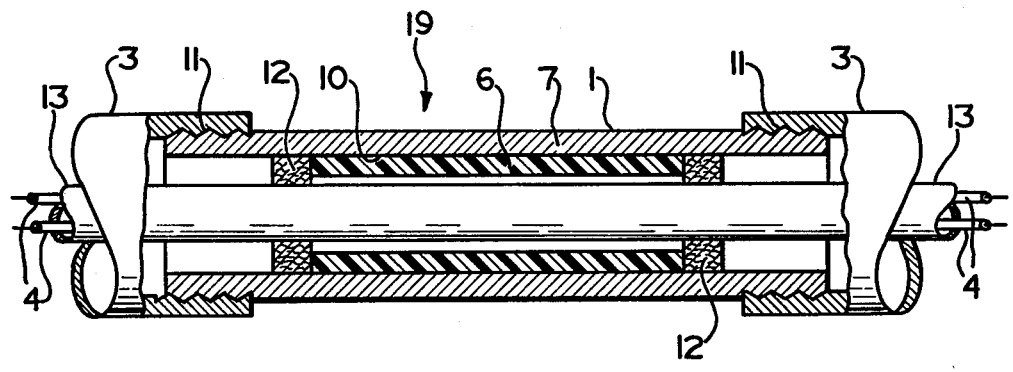
FIGS. 3 through 5 show an axial longitudinal section of other embodiments of the connector of the invention prior to their exposure to heat.

FIG. 3 shows an embodiment of the invention in the form of connector 19 prior to its exposure to an amount of heat sufficient to expand material 6 as previously described. Connector 19 has a sleeve 1 that is threadingly secured to conduits 3 by means of mating threads 11. In this case, the outer surface of the opposite ends of wall 7 are threaded to engage with mating threads 11 on the inner surface of the end of conduits 3 rather than the reverse situation shown in FIGS. 1 and 2. Electrical cable 13 extends through connector 19 between conduits 3. Cable 13 contains a pair of electrical conductors 4 as shown in FIG. 3.

An annular layer of material 6, previously described with respect to the embodiment shown in FIGS. 1 and 2, is disposed on inner surface 10 of wall 7 which encloses chamber 2 within sleeve 1. Material 6 is able to expand and engulf cable 13 and fill chamber 2 sufficiently to provide a barrier against the flow of vapor between conduits 3 through connector 19. Although connector 19 is similar to connector 18 of FIG. 1, it additionally includes barriers 12 disposed within chamber 2 between the opposite ends of the layer of material 6 and the end of the conduit 3 adjacent thereto. Barriers 12 are included to prevent material 6 from expanding into the ends of conduit 3 where such expansion may be undesirable. Barriers 12 are in the form of a rigid or flexible fibrous packing such as fibrous glass that is able to permit cable 13 to extend through connector 19 yet prevent material 6 from expanding into the ends of conduits 3. Understandably, barriers 12 may have any configuration and may be made from any material such as a heat recoverable metallic or polymeric material having a recovery temperature that is not more than about the temperature at which material 6 is able to expand so long as they are able to prevent material 6 from expanding into the ends of conduits 3 and are able to resist the amount of heat required to expand material 6 and are not degrading to material 6 or the material from which conduits 3 and sleeve 1 are made. The barriers may also be secured to the inner surface of wall 10.

FIG. 4 shows an embodiment of the invention in the form of connector 20. Connector 20 has a sleeve 1 having an annular wall 7 enclosing chamber 2 as previously described with respect to connectors 18 and 19. An annular layer of previously described expandable material 6 is disposed on inner surface 10 of wall 7 and is secured thereto by means of a layer of adhesive 14 disposed between the layer of material 6 and inner surface 10 of wall 7. An electrical conductor 4 extends through conduits 3 and connector 20. The presence of only one conductor 4 illustrates that the connector of the invention can be used to connect two or more conduits together in which one or more electrical conductors and/or electrical cables are required to pass from one conduit to the other through the connector. A layer of adhesive 14 is likewise coated about the outer surface of conductor 4 within chamber 2 and on the inner surface of the material 6 layer facing towards conductor 4 as well as being disposed between inner surface 10 of sleeve 1 and the outer surface of conduits 3 within connector 20.

Adhesive 14 is made of a material that is able to secure material 6 to the inner surface 10 of wall 7 as well as having sufficient temperature resistance as not to be degraded by the amount of heat required to expand material 6. Adhesive 14 is also able to bond material 6 to inner surface 10 of wall 7 as well as to bond material 6 to conductor 4 upon the expansion of material 6 by heat. The layer of adhesive 14 between the outer surface of conduits 3 and inner surface 10 of wall 7 is likewise able to bond connector 20 to conduits 3. Although adhesive 14 is shown in FIG. 4 as a coating on conductor 4 and as a layer on inner surface 10 of wall 7 and as a layer on the inner surface of material 6 facing towards conductor 4, it is to be understood that such is for illustrative purposes only and that an adhesive of any type possessing the required properties may be used singularly or in combination with a coating on one or more conductors contained within chamber 2 and as a means of securing material 6 to inner surface 10 of wall 7 and as a means of bonding the connector of the invention to the conduit to which it is connected. Such coatings or layers of adhesive may also be made from different materials. Also illustrated in FIG. 4 is the fact that the length of the layer of material 6 does not have to be shorter than the length of chamber 2 between the ends of conduits 3 but may entirely occupy the length of chamber 2 between the ends of conduits 3 when such is desired and the effect thereof will not interfere with the securement of the connector of the invention to the conduits.

In the event the conduits and sleeve 1 are made from different metals that are apt to promote galvanic corrosion because of their adjacent relationship after the connector of the invention has been contracted against the conduits by heat, means for preventing galvanic corrosion such as a suitable liner, or an adhesive layer such as adhesive 14 where suitably effective or a suitable polymeric coating on either or both the outer surface of the conduits and the inner surface of sleeve 1 in the region of securement therebetween may be used to prevent such galvanic corrosion.

Figure 5:
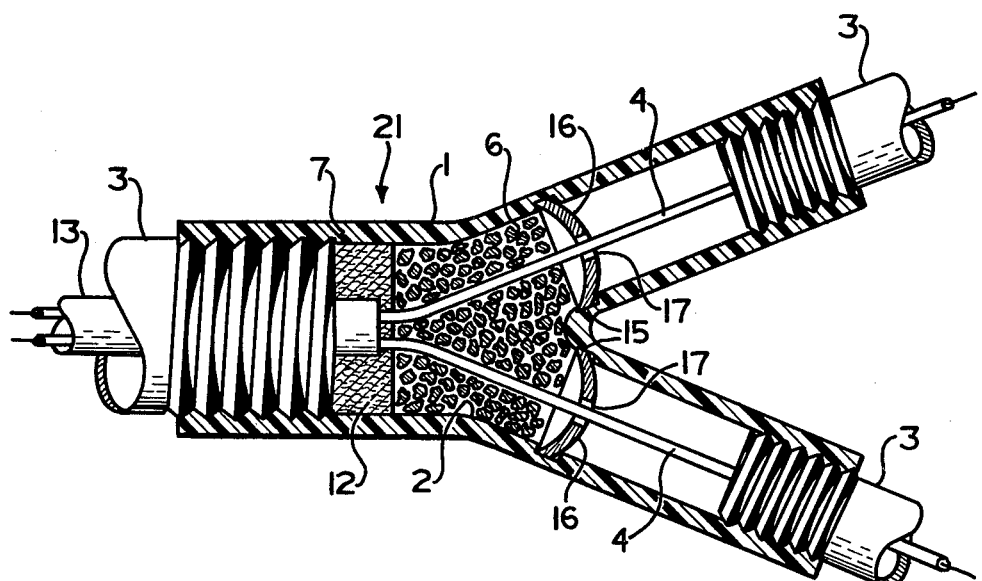

FIG. 5 shows an embodiment of the invention in the form of connector 21 prior to the expansion by heat of previously described expandable material 6 contained within chamber 2 enclosed by wall 7 of sleeve 1. Connector 21 is illustrative of the fact that connectors of the invention may have any configuration necessary to connect at least two conduits together in the manner desired. Connector 21 connects three conduit 3 together in the "Y" shaped configuration shown in FIG. 5. All three of the conduits 3 are threadingly secured to connector 21. An electrical cable 13 extends through conduit 3 to the viewer's left in FIG. 5 into chamber 2 and branches into conductors 4 within connector 21 and extends respectively through connector 21 into separate conduits 3 as shown in FIG. 5. A layer of previously described material 6 is disposed in the form of particles within chamber 2. Material 6 is a material as previously described herein that is able to expand and engulf conductors 4 and provide a barrier against the flow of vapors between conduits 3. Previously described barrier 12 may be made from any suitable material and is shown in FIG. 5 as fibrous packing. Barrier 12 is disposed between material 6 and the conduit 3 containing cable 13 as a means of preventing material 6 from expanding into the end of conduit 3 containing cable 13. Barriers 16, secured by internal annular grooves 15 in wall 7, are disposed between material 6 and the conduits 3 containing each of the two conductors 4 that branch from cable 13 within connector 21. Barriers 16 have an opening 17 therethrough which respectively enable each conductor 4 to extend between conduits 3 as shown in FIG. 5. Barriers 16 like previously described barriers 12 may be made of any suitable material that is able to suitably withstand the amount of heat necessary to expand material 6 as well as having the ability of preventing material 6 from expanding into the conduits 3 containing conductors 4 where such is desired. The embodiment of the connector of the invention of FIG. 5 is illustrative of the fact that, although preferable, it is not required that material 6 be disposed on the inner surface of the sleeve as previously described and that material 6 may be disposed in any form such as a solid mass or in the form of pellets or particles in chamber 2 provided that upon its expansion by heat it is able to engulf the electrical conductors and/or electrical cables contained within the connector and fill the connector sufficiently to provide a barrier against the flow of vapor between the conduit connected together thereby.

What is claimed is:

1. A connector assembly for connecting the ends of at least two conduits together having at least one electrical conductor extending therebetween in such a manner as to provide a barrier against the flow of vapor through the conduits, said connector assembly comprising a sleeve made from a heat stable material having a chamber therewithin enclosed by a wall of the sleeve having an inner and outer surface with at least a portion of the inner surface facing towards the conductor, said sleeve having respective openings therein surrounded by respective walls of the sleeve for communicating with the chamber that are respectively dimensionally adapted to enable the ends of the respective conduits to be inserted therethrough into the chamber, means associated with the respective openings for connecting the sleeve to the respective conduits which enable the conductor to extend through the chamber from one conduit to the other in the manner desired, an expandable material disposed in the chamber that is adapted to expand in response to exposure of the sleeve to an amount of heat sufficient to cause the expandable material to expand and engulf the conductor and fill the chamber sufficiently to provide a barrier against the flow of vapor between the conduits without damage to the conductor, and means disposed within the chamber to prevent the expandable material from expanding into the ends of the conduits.

2. The connector assembly of claim 1 wherein the means for preventing the expandable material from expanding into the conduit ends comprises a barrier member disposed about the conductor between the expandable material and the conduit ends.

3. The connector assembly 2 of claim 2 wherein the barrier member is a fibrous material.

4. The connector assembly of claim 3 wherein the fibrous material is a fibrous glass material.

5. The connector assembly of claim 2 wherein the barrier member is made from a heat recoverable metal having a recovery temperature of not more than about the temperature of expansion of the expandable material.

6. The connector assembly of claim 2 wherein the barrier member is made from a heat recoverable polymeric material having a recovery temperature of not more than about the temperature of expansion of the expandable material.

7. The connector assembly of claim 1 wherein the expandable material is disposed in the form of a layer on the inner surface of the sleeve wall surrounding the chamber that faces towards the conductor, said layer having an inner surface thereof facing towards the conductor and dimensionally adapted to permit the conductor to pass through the chamber in the manner desired prior to the expansion thereof by heat.

8. The connector assembly of claim 7 wherein the layer of expandable material is secured to the inner surface of the sleeve by means of an adhesive.

9. The connector assembly of claim 1 including a coating of adhesive disposed on the conductor that is adapted to bond the conductor to the expanded material to enhance the barrier against the flow of vapor through the conduits provided by the expanded material.

10. The connector assembly of claim 7 including a coating of adhesive disposed on the inner surface of the expandable material layer facing towards the conductor that is adapted to bond the conductor to the expanded material to enhance the barrier against flow of vapor through the conduits provided by the expanded material.

11. The connector assembly of claim 1 wherein the expandable material is a material that expands into a foam in response to the heat.

12. The connector of claim 1 wherein the expanded material contains an amount of a heat activatable cross-linking agent sufficient to cross link the expanded material in response to the heat.

13. The connector assembly of claim 1 wherein the means for connecting the connector to the conduits comprises threads disposed in the sleeve wall surrounding the openings in such a manner as to enable the conduits to be threadingly connected to the sleeve.

14. The connector assembly of claim 1 wherein the sleeve is made from a metallic material.

15. The connector assembly of claim 1 wherein the conduits are made from a metallic material.

16. The connector assembly of claim 1 wherein the sleeve is made from a polymeric material having sufficient heat stability to resist degradation and substantial dimensional change upon exposure of the connector assembly to the amount of heat necessary to expand the expandable material disposed within the chamber.

17. The connector assembly of claim 1 wherein the conduits are made from a polymeric material having sufficient heat stability to resist degradation and dimensional change upon the exposure of the connector assembly to an amount of heat necessary to expand the expandable material disposed within the chamber.

18. The connector assembly of claim 1 wherein the conduits and sleeve are made from different metals and means for preventing galvanic corrosion is disposed between the outer surface of the conduits and the inner surface of the sleeve in the region of securement therebetween.

* * * * *